United States Patent
Kisailus et al.

(10) Patent No.: US 9,586,822 B2
(45) Date of Patent: Mar. 7, 2017

(54) SIZE AND MORPHOLOGICALLY CONTROLLED NANOSTRUCTURES FOR ENERGY STORAGE

(71) Applicant: The Regents of the University of California, Oakland, CA (US)

(72) Inventors: David Kisailus, Riverside, CA (US); Jianxin Zhu, Riverside, CA (US)

(73) Assignee: The Regents of the University of California, Oakland, CA (US)

( * ) Notice: Subject to any disclaimer, the term of this patent is extended or adjusted under 35 U.S.C. 154(b) by 111 days.

(21) Appl. No.: 14/348,772

(22) PCT Filed: Oct. 10, 2012

(86) PCT No.: PCT/US2012/059557
§ 371 (c)(1),
(2) Date: Mar. 31, 2014

(87) PCT Pub. No.: WO2013/055792
PCT Pub. Date: Apr. 18, 2013

(65) Prior Publication Data
US 2014/0234195 A1    Aug. 21, 2014

Related U.S. Application Data

(60) Provisional application No. 61/545,517, filed on Oct. 10, 2011.

(51) Int. Cl.
*C01B 25/45* (2006.01)
*H01M 4/139* (2010.01)
*H01M 4/58* (2010.01)
*H01M 10/0525* (2010.01)

(52) U.S. Cl.
CPC .............. *C01B 25/45* (2013.01); *H01M 4/139* (2013.01); *H01M 4/5825* (2013.01); *H01M 10/0525* (2013.01); *Y02E 60/122* (2013.01)

(58) Field of Classification Search
CPC ..... C01B 25/45; H01M 4/5825; H01M 4/139; H01M 10/0525; Y02E 60/122
See application file for complete search history.

(56) References Cited

U.S. PATENT DOCUMENTS

| 7,326,399 B2 | 2/2008 | Zhou et al. |
| 2007/0054187 A1 | 3/2007 | Nuspl et al. |
| 2008/0292522 A1 | 11/2008 | Kim et al. |

(Continued)

FOREIGN PATENT DOCUMENTS

| EP | 2463237 A1 | 6/2012 |
| WO | 2009011658 A1 | 1/2009 |

OTHER PUBLICATIONS

Dow, Triethylene Glycol (2007), retrieved from http://msdssearch.dow.com/PublishedLiteratureDOWCOM/dh_004d/0901b8038004d042.pdf?filepath=ethyleneglycol/pdfs/noreg/612-00004.pdf&fromPage=GetDoc.*

(Continued)

*Primary Examiner* — Anthony J Zimmer
(74) *Attorney, Agent, or Firm* — Joseph R. Baker, Jr.; Gavrilovich, Dodd & Lindsey LLP

(57) ABSTRACT

The disclosure relates to a process to synthesize nanostructures of a uniform size distribution and/or morphology, nanostructures resulting therefrom, and the use of the nanostructures in energy storage devices.

32 Claims, 3 Drawing Sheets

(56) References Cited

U.S. PATENT DOCUMENTS

| | | | |
|---|---|---|---|
| 2010/0084615 A1* | 4/2010 | Levasseur | B82Y 30/00 |
| | | | 252/506 |
| 2010/0086852 A1 | 4/2010 | Gibot et al. | |
| 2010/0327222 A1 | 12/2010 | Levasseur et al. | |
| 2011/0068295 A1 | 3/2011 | Beck et al. | |
| 2012/0267321 A1 | 10/2012 | Kisailus et al. | |

OTHER PUBLICATIONS

Ellis et al., "Synthesis of nanocrystals and morphology control of hydrothermally prepared LiFePO4," J. Mater. Chem., 2007, 17, 3248-3254.*

Mineko Mohri, International Preliminary Report on Patentability, PCT/US2012/059557, The International Bureau of WIPO, Apr. 24, 2014.

Kolen'Ko et al., "Photocatalytic properties or titania powders prepared by hydrothermal method," Applied Catalysis B: Environmetnal, 2004, pp. 51-58, 2004.

Lee, Dong Wook, International Search Report and Written Opinion, PCT/US2012/059557, Korean Intellectual Property Office, Feb. 15, 2013.

Morawski et al., "Carbon modified TiO2 photocatalysts for water purification," Polish J. of Chemical Tech., 2009, pp. 46-50, vol. 11, No. 2.

Yang et al., "Generalized syntheses of large-pore mesoporous metal oxides with semicrystalline frameworks," Nature, Nov. 1998, pp. 152-155. vol. 369.

* cited by examiner

SIZE AND MORPHOLOGICALLY CONTROLLED NANOSTRUCTURES FOR ENERGY STORAGE

CROSS REFERENCE TO RELATED APPLICATIONS

This application is a U.S. National Stage Application and claims priority to International Application No. PCT/US2012/059557, filed Oct. 10, 2012, which application claims priority to U.S. Provisional Application Ser. No. 61/545,517, filed Oct. 10, 2011, the disclosures of which are incorporated herein by reference.

TECHNICAL FIELD

The invention relates to methods to synthesize nanostructures, such as lithium metal phosphate nanoparticles, and the use thereof in energy storage devices, such as Li-insertion batteries.

BACKGROUND

Methods to make nanoparticles for energy storage devices, such as lithium metal phosphates, use solid-state reactions at high temperatures resulting in nanoparticles that are heterogeneous in size and morphology. These methods, therefore, have to incorporate an additional milling or grinding step in attempts to reduce and make more uniform the nanoparticle size distribution. Non-uniform nanoparticle size and morphology increases stress concentrations and de-stabilizes charge distribution in energy storage devices.

SUMMARY

The following disclosure presents methods to synthesize nanostructures which have a uniform size and/or morphology distribution under low heat conditions and without any milling or grinding steps, which can then be used in various energy storage devices, such as Ni-insertion batteries. In a certain embodiment, the disclosure provides one or more methods for synthesizing size and/or morphologically controlled nanostructures, so that the nanostructures produced by the methods can be used directly in energy storage devices, such as Ni-insertion batteries, without having to first grind down or mill the nanostructures.

In a particular embodiment, the disclosure provides a method of synthesizing size and/or morphologically controlled nanostructures comprising heating a reaction mixture comprising a first metal salt and comprising a second metal salt at room temperature or greater for at least 2 hours. In a certain embodiment, the disclosure provides a method of synthesizing size and/or morphologically controlled nanostructures without comprising any grinding or milling steps. In a further embodiment, the reaction mixture is formed by mixing a solution comprising a first metal salt with a solution comprising a second metal salt. In another embodiment, one or more specific polymers are added to the solution comprising the first metal salt, one or more specific polymers are added to the solution comprising the second metal salt and/or one or more specific polymers are added to the reaction mixture. In yet another embodiment, the pH of the solution comprising the first metal salt is adjusted by adding either an acid or base, the pH of the solution comprising the second metal salt is adjusted by adding either an acid or base and/or the pH of the reaction mixture is adjusted by adding either an acid or base. In a further embodiment, the pH of the solution comprising the first metal salt, the pH of the solution of comprising the second metal salt, and/or the pH of the reaction mixture, is adjusted with nonaqueous acid, such as nonaqueous polyprotic acid, including phosphoric acid, or alternatively with an aqueous acid, such as aqueous polyprotic acid, including aqueous sulfuric acid.

In a particular embodiment, the disclosure provides a method of synthesizing size and/or morphologically controlled nanostructures comprising heating a reaction mixture comprising a first metal salt and comprising a second metal salt at room temperature or greater for at least 2 hours, wherein the first metal salt comprises a transition metal, including, but not limited to, manganese, iron, titanium, zinc, copper, cobalt and nickel. In a certain embodiment, the first metal salt comprises iron. In yet a further embodiment, the first metal salt comprises a polyatomic anion, including, but not limited to, phosphate, sulfate, nitrate, molybdate, oxalates, chlorate, and carbonate. In a certain embodiment, the first metal salt comprises sulfate.

In a particular embodiment, the disclosure provides a method of synthesizing size and/or morphologically controlled nanostructures comprising heating a reaction mixture comprising a first metal salt and comprising a second metal salt at room temperature or greater for at least 2 hours, wherein the reaction mixture is formed by mixing a solution comprising a first metal salt with a solution comprising a second metal salt, and wherein the first metal salt is dissolved in one or more polar solvents. In a further embodiment, the first metal salt is dissolved in water and/or a glycol. In a certain embodiment, the first metal salt is dissolved in a mixture of water and triethylene glycol.

In a particular embodiment, the disclosure provides a method of synthesizing size and/or morphologically controlled nanostructures comprising heating a reaction mixture comprising a first metal salt and comprising a second metal salt at room temperature or greater for at least 2 hours, wherein the second metal salt comprises lithium. In yet a further embodiment, the second metal salt comprises a polyatomic anion, including, but not limited to, hydroxide, perchlorate, carbonate, diethyl carbonate, tetrafluoroborate, hexaflourophosphate, and triflate. In a certain embodiment, the polyatomic anion is hydroxide.

In a particular embodiment, the disclosure provides a method of synthesizing size and/or morphologically controlled nanostructures comprising heating a reaction mixture comprising a first metal salt and comprising a second metal salt at room temperature or greater for at least 2 hours, wherein the reaction mixture is formed by mixing a solution comprising a first metal salt with a solution comprising a second metal salt, and wherein the second metal salt is dissolved in one or more polar solvents. In a further embodiment, the first metal salt is dissolved in water and/or a glycol. In a certain embodiment, the first metal salt is dissolved in triethylene glycol.

In a particular embodiment, the disclosure provides a method of synthesizing size and/or morphologically controlled nanostructures comprising heating a reaction mixture comprising a first metal salt and comprising a second metal salt at room temperature or greater for at least 2 hours, wherein the concentration of the first metal salt is equal to the concentration of the second metal salt. In a further embodiment, the concentration of the first metal salt is greater than the concentration of the second metal salt. In an alternate embodiment, the concentration of the first metal salt is less than the concentration of the second metal salt. In a certain embodiment, the concentration of the first metal salt is at least three times less than the concentration of the second metal salt.

In a particular embodiment, the disclosure provides a method of synthesizing size and/or morphologically controlled nanostructures comprising heating a reaction mixture comprising a first metal salt and comprising a second metal salt at room temperature or greater for at least 2 hours, wherein the reaction mixture is heated in a sealed reactor, such as a Teflon™ reactor. In a further embodiment, the reaction mixture is heated at 50° C. or greater for at least 2 hours in a sealed reactor. In yet a further embodiment, the reaction mixture is heated at 100° C. or greater in a sealed reactor. In another embodiment, the reaction mixture is heated at 150° C. or greater in a sealed reactor. In yet another embodiment, the reaction mixture is heated at a temperature between 150° C. to 200° C. for 2 to 12 hours in a sealed reactor. In an alternate embodiment, the reaction mixture is heated at least 2 hours in a sealed reactor at a temperature less than 250° C., less than 200° C., less than 150° C., less than 100° C., or less than 50° C.

In a particular embodiment, one or more methods disclosed herein produce nanostructures that have a uniform size distribution, including having diameters of less than 100 nm. In a certain embodiment, one or more methods disclosed herein produce nanostructures that have a uniform morphology, including but not limited to, nanoparticles, nanobelts, nanocubes, and nanoprisms.

In a further embodiment, an energy storing device, such as a Li-insertion battery, comprises nanostructures produced by one or more methods disclosed herein.

BRIEF DESCRIPTION OF FIGURES

The accompanying Figures, which are incorporated into and constitute a part of this specification, illustrate one or more embodiments of the disclosure and, together with the detailed description, serve to explain the principles and implementations of the disclosure.

DETAILED DESCRIPTION

Figure 1:
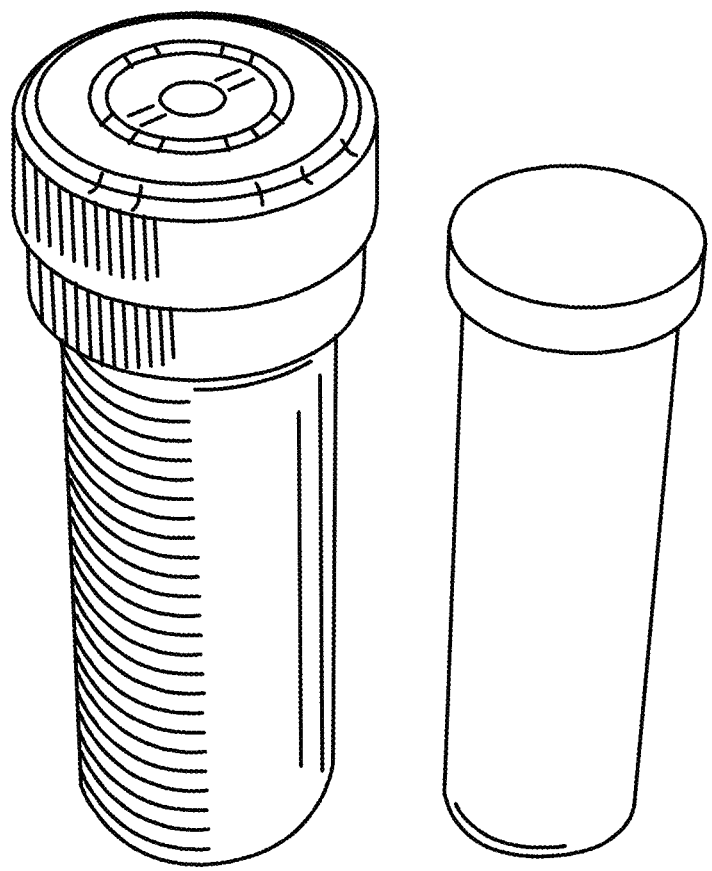
FIG. 1 provides an experimental apparatus (left to right: stainless steel autoclave, Teflon liner) to make the nanostructures of the disclosure.

As used herein and in the appended claims, the singular forms "a," "and," and "the" include plural referents unless the context clearly dictates otherwise. Thus, for example, reference to "a nanostructure" includes a plurality of such nanostructures and reference to "the nanostructures disclosed herein" includes reference to nanostructures resulting from the process and reaction conditions disclosed herein.

Also, the use of "or" means "and/or" unless stated otherwise. Similarly, "comprise," "comprises," "comprising" "include," "includes," and "including" are interchangeable and not intended to be limiting.

It is to be further understood that where descriptions of various embodiments use the term "comprising," those skilled in the art would understand that in some specific instances, an embodiment can be alternatively described using language "consisting essentially of" or "consisting of."

Unless defined otherwise, all technical and scientific terms used herein have the same meaning as commonly understood to one of ordinary skill in the art to which this disclosure belongs. Although methods and materials similar or equivalent to those described herein can be used in the practice of the disclosed methods and compositions, the exemplary methods, devices and materials are described herein.

Materials used to make cathodes for lithium insertion batteries comprise large particles that lack homogeneity in size distribution. Current methods to synthesize $LiFePO_4$ particles use solid-state reactions at high temperatures, co-precipitation in aqueous media, hydrothermal synthesis or mechanical-chemical activation. The resulting $LiFePO_4$ particles range in size from the 100's of nanometers in diameter to the 100's of microns in diameter. Such heterogeneity in particle size causes stress to be focused in limited areas, resulting in degrading the mechanical properties of the materials during charge and discharge. The concentration of stress is due to the difference in strain within particles that are partially charged (i.e., particles that are partially filled with Li-ions). Continuous charging and discharging can cause mechanical strain that leads to cracking and eventual failure of cathodes. In addition, the large sizes of cathode particles can lead to extreme charging times and makes the battery not practical. Using smaller particles can avoid this long charge time, but have lower tap densities (fill densities) that reduce energy density.

The process disclosed herein controls the size and/or shape of the resulting particles in a facile one-step process. Traditional lithium-iron phosphate (LFP) materials are synthesized in solid-state reactions at high temperatures, and require co-precipitation in aqueous media, hydrothermal synthesis or mechanical-chemical activation. Since the process disclosed herein is carried out under relatively mild conditions, there is no need for costly capital equipment, waste disposal, and/or labor costs (from time intensive processing).

The method to make nanostructures disclosed herein comprises heating a reaction mixture formed by combining a solution comprising a first metal salt with a solution comprising a second metal salt. The method may further comprise one or more pH adjustment steps, polymer addition steps, and/or purification steps. The method disclosed herein, involves dissolving a first metal salt in a solvent, dissolving a second metal salt, combining the dissolved metal salts to form a reaction mixture, and then incubating the reaction mixture at room temperature or greater for a sufficient period of time (e.g., from about 2-48 hours, 2-24 hours, 2-10 hours, 5-10 hours, 2-4 hours and any range or numerical value of any of the foregoing). In another embodiment, the reaction mixture is placed inside an autoclave reaction vessel and heated to temperatures greater than 50° C., typically greater than 100° C., for a few hours (e.g., 2-5 hours). The method disclosed herein, may further comprise steps to adjust the pH of the solutions, steps to add polymers to the solutions or reaction mixture and/or add steps for purifying the resulting nanoparticles. Choice of the solvent/co-solvent systems, addition of specific polymers, and modifying the pH of the solutions, enables size and morphological control of the resulting nanostructures. Using the method disclosed herein, one can obtain lithium-iron phosphate nanocrystals with a controlled range of size and shapes. The advantages of the method disclosed herein include, but are not limited to: (i) precise control of the shape and/or size of the nanostructures produced, (ii) the nanostructures produced can be used in battery cathodes with a need for fast charge times and potential for high tap densities, (iii) it is a relatively inexpensive method, and (iv) it can be easily scaled up for industrial production.

Figure 2:
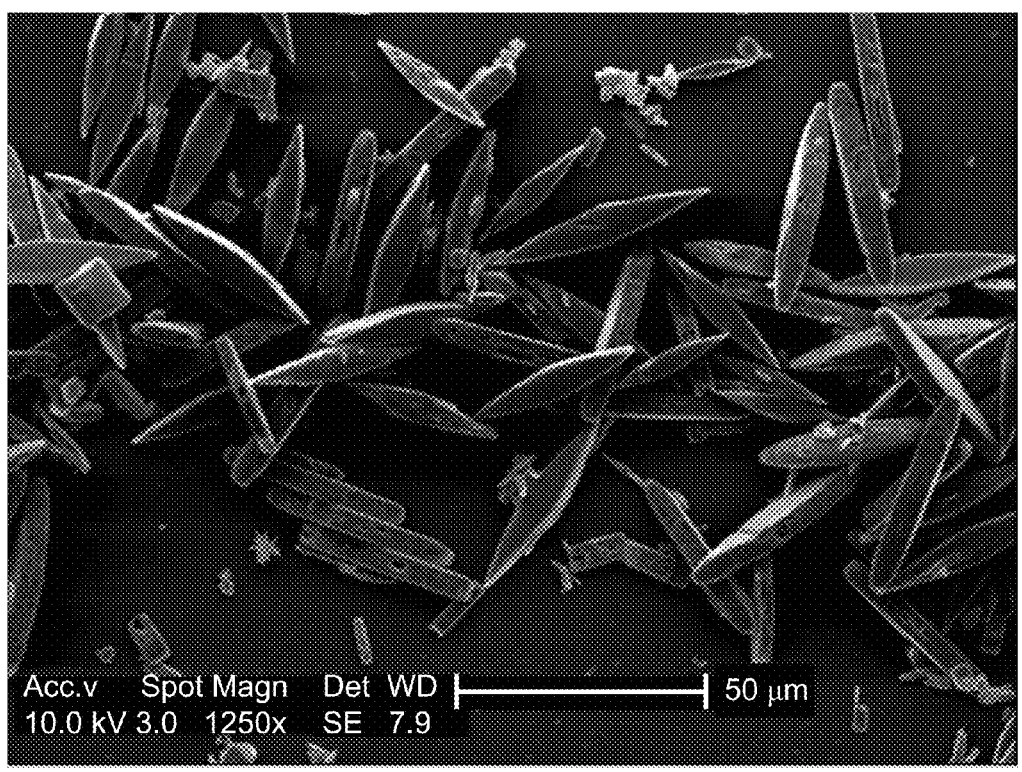
FIG. 2 provides Scanning Electron Micrographs of the $LiFePO_4$ structures synthesized without controls.
Figure 3:
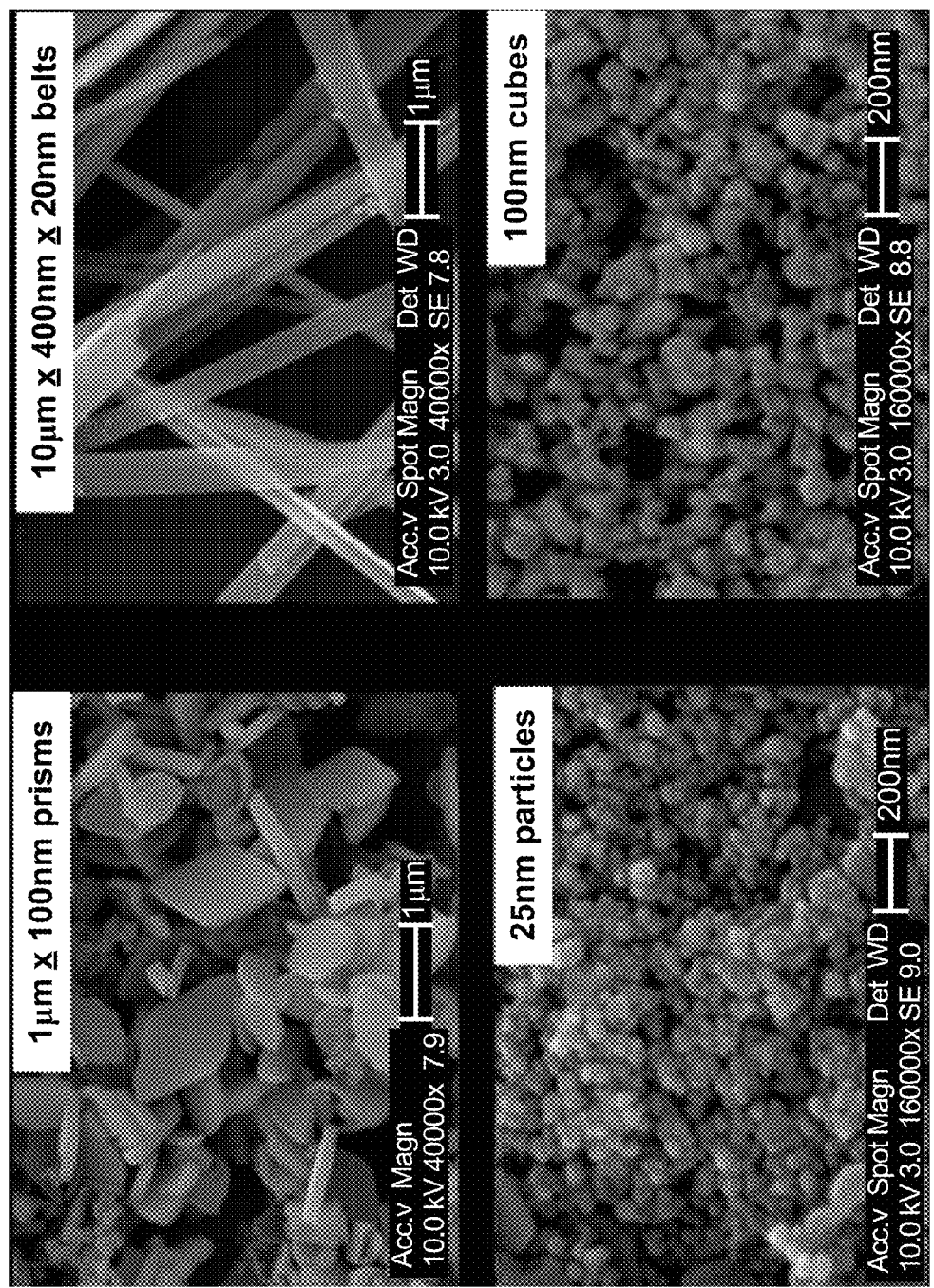
FIG. 3 provides Scanning Electron Micrographs of various $LiFePO_4$ nanostructures synthesized by utilizing control mechanisms described in this disclosure. Upper Left: 1 µm×100 nm nanoprisms; Lower Left: 25 nm nanoparticles; Upper Right: 10 µm×400 nm×20 nm nanobelts; Lower Right: 100 nm nanocubes.

Using the methods disclosed herein, nanostructured lithium-iron phosphate (LFP) materials were produced in defined uniform shapes and sizes under mild temperatures (150° C.) and near-neutral pH within sealed reaction vessels (see, e.g., FIG. 2 and FIG. 3).

The size and/or morphology controlled nanostructure synthesis process disclosed herein comprises dissolving a first metal salt in one or more solvents.

In a particular embodiment, the first metal salt comprises a metal that is an alkali metal, alkaline earth metal, transition metal, post-transition metal, or lanthanide. In a further embodiment, the first metal salt comprises a metal that is a transition metal. In a yet further embodiment, the first metal salt comprises a metal selected from the group comprising, manganese, iron, titanium, zinc, copper, cobalt and nickel. In a certain embodiment the first metal salt comprises iron.

In another embodiment, the first metal salt comprises either a polyatomic anion or monoatomic anion. In a further embodiment, the first metal salt comprises a polyatomic anion and/or monoatomic anion selected from the group comprising sulfate, nitrate, phosphate, halide, dihydrogen phosphate, acetate, hydrogen sulfite, hydrogen sulfate, hydrogen carbonate, nitrite, cyanide, hydroxide, permanganate, hypochlorite, chlorate, perchlorate, hydrogen phosphate, oxalate, sulfite, carbonate, chromate, dichromate, silicate, molybdate, phosphite, diethyl carbonate, tetrafluoroborate, hexaflourophosphate, and triflate. In yet another embodiment the first metal salt comprises a polyatomic anion selected from the group comprising phosphate, sulfate, nitrate, molybdate, oxalate, chlorate, and carbonate. In a certain embodiment the first metal salt comprises a polyatomic anion that is either sulfate, or phosphate. In yet another embodiment the first metal salt comprises a polyatomic anion that is a sulfate.

In a particular embodiment, the first metal salt is dissolved in one or more solvents. In another embodiment, the first metal salt is dissolved in one or more polar solvents. In a further embodiment, the first metal salt is dissolved in one or more aqueous and/or non-aqueous solvents. In a further embodiment, the first metal salt is dissolved in one or more polar solvents comprising water, dihydroxy alcohols, alcohols, acetic acid, formic acid, ethyl acetate, tetrahydrofuran, dichloromethane, acetone, acetonitrile, dimethylformamide, dimethyl sulfoxide, and the like. In a further embodiment, the first metal salt is dissolved in mixture of solvents. In yet a further embodiment, the first metal salt is dissolved in water and/or a glycol, such as triethylene glycol (TEG). In a certain embodiment, the first metal salt is dissolved in water and TEG, wherein this water/TEG mixture can range from almost 99.9% water to almost 99.9% TEG with specific volumetric ratios in between depending on desired product.

The size and/or morphology controlled nanostructure synthesis process disclosed herein comprises forming a reaction mixture comprising combining a solution comprising a first metal salt with a solution comprising a second metal salt.

In a certain embodiment, the second metal salt comprises a metal that is an alkali metal, alkaline earth metal, transition metal, post-transition metal, or lanthanide. In a further embodiment, the second metal salt comprises a metal that is an alkali metal. In a certain embodiment, the second metal salt comprises lithium.

In another embodiment, the second metal salt comprises either a polyatomic anion or monoatomic anion. In a further embodiment, the second metal salt comprises a polyatomic anion and/or monoatomic anion selected from the group comprising sulfate, nitrate, phosphate, halide, dihydrogen phosphate, acetate, hydrogen sulfite, hydrogen sulfate, hydrogen carbonate, nitrite, cyanide, hydroxide, permanganate, hypochlorite, chlorate, perchlorate, hydrogen phosphate, oxalate, sulfite, carbonate, chromate, dichromate, silicate, molybdate, phosphite, diethyl carbonate, tetrafluoroborate, hexaflourophosphate, and triflate. In another embodiment, the second metal salt comprises hydroxide, perchlorate, carbonate, diethyl carbonate, tetrafluoroborate, hexaflourophosphate, or triflate. In yet another embodiment the second metal salt comprises a polyatomic anion that is hydroxide.

In a particular embodiment, the second metal salt is dissolved in one or more solvents. In another embodiment, the second metal salt is dissolved in one or more polar solvents. In a further embodiment, the second metal salt is dissolved in one or more aqueous and/or non-aqueous solvents. In a further embodiment, the second metal salt is dissolved in one or more polar solvents comprising water, dihydroxy alcohols, alcohols, acetic acid, formic acid, ethyl acetate, tetrahydrofuran, dichloromethane, acetone, acetonitrile, dimethylformamide, dimethyl sulfoxide, and the like. In a further embodiment, the second metal salt is dissolved in mixture of solvents. In yet a further embodiment, the second metal salt is dissolved in water and/or a glycol, such as triethylene glycol (TEG). In a certain embodiment, the second metal salt is dissolved in water and TEG, wherein this water/TEG mixture can range from almost 99.9% water to almost 99.9% TEG with specific volumetric ratios in between depending on desired product.

The ratio of the concentrations of the first metal salt with that of the second metal salt will primarily dictate the relative size of the nanostructures disclosed herein, wherein the higher the concentration of the first metal salt as it relates to the second metal salt, the smaller the resulting nanostructures. In a particular embodiment, the concentration of the first metal salt is equal to concentration to the second metal salt. In another embodiment, the second metal salt is at a greater concentration than the first metal salt. In a yet further embodiment, the concentration of the second metal salt is at least twice the concentration of the first metal salt. In a yet further embodiment, the concentration of the second metal salt is at least three times the concentration of the first metal salt. In a yet further embodiment, the concentration of the second metal salt is between two times to ten times the concentration of the first metal salt. In another embodiment, the concentration of the first metal salt is greater than the concentration of the second metal salt. In a yet further embodiment, the concentration of the first metal salt is at least two times the concentration of the second metal salt. In a yet further embodiment, the concentration of the first metal salt is at least three times the concentration of the second metal salt. In yet another embodiment, the concentration of the first metal salt is between two times to ten times the concentration of the second metal salt.

The size and/or morphology controlled nanostructure synthesis process disclosed herein comprises a heating step/incubation step, wherein a reaction mixture is maintained at room temperature or higher (e.g., at least 25-50° C.), wherein the reaction mixture is formed by combining a solution comprising a first metal salt with a solution comprising a second metal salt. In instances where the pH of the reaction mixture is adjusted and/or where one or more specific polymers are added to the reaction mixture, shall be interpreted for the purposes of this section to be included in the term "the reaction mixture." In a certain embodiment, the reaction mixture is maintained at room temperature for at least 2-24 hours. In a certain embodiment, the reaction mixture is maintained at least 50° C. for at least about 2 hours. In another embodiment, the reaction mixture is maintained at least about 100° C. for at least about 2 hours. In yet another embodiment, the reaction mixture is maintained at least about 150° C. for at least about 2 hours. In a further embodiment, the reaction mixture is maintained at least about 200° C. for at least about 2 hours. In yet a further embodiment, the reaction mixture is heated in a sealed reactor, such as a Teflon™ or glass reactor (e.g., see FIG. 1).

In a further embodiment, the size and/or morphology controlled nanostructure synthesis process disclosed herein further comprises one or more pH adjustment steps. In a particular embodiment, the pH of a solution comprising a first metal salt, the pH of a solution comprising a second metal salt and/or the pH of the reaction mixture, is adjusted by adding either an acid or base. In another embodiment, the pH of a solution comprising a first metal salt, the pH of a solution comprising a second metal salt and/or the pH of the reaction mixture, is adjusted by adding an acid. In a further embodiment, the pH of a solution comprising a first metal salt, the pH of a solution comprising a second metal salt and/or the pH of the reaction mixture, is adjusted by adding a multiprotic acid. In yet another embodiment, the pH of a solution comprising a first metal salt, the pH of a solution comprising a second metal salt and/or the pH of the reaction mixture, is adjusted by adding an aqueous acid solution. In a further embodiment, the pH of a solution comprising a first metal salt, the pH of a solution comprising a second metal salt and/or the pH of the reaction mixture, is adjusted by adding a nonaqueous and/or aqueous multiprotic acid solution including, but not limited to, phosphoric acid, sulfuric acid, carbonic acid, sulfurous acid, oxalic acid, malonic acid, or hydrogen sulfide acid. In yet a further embodiment, the pH of a solution comprising a first metal salt, the pH of a solution comprising a second metal salt and/or the pH of the reaction mixture, is adjusted with phosphoric acid. In another embodiment, the pH of a solution comprising a first metal salt, the pH of a solution comprising a second metal salt and/or the pH of the reaction mixture, is adjusted with aqueous sulfuric acid.

In a further embodiment, the size and/or morphology controlled nanostructure synthesis process disclosed herein further comprises one or more polymer addition steps. For example, one or more specific polymers (e.g., polyvinyl pyrrolidone, polyacrylic acid) can be added to a solution comprising a first metal salt, a solution comprising a second metal salt and/or to the reaction mixture. In a particular embodiment, one or more polymers are added to the reaction mixture. In addition, the polymer can be modified to one that morphologically controls metals, metal nitrides, metal carbides, etc. The polymer can also be modified to be electrically conducting, allowing the production of electronic and optoelectronic devices.

In a certain embodiment, the size and/or morphology controlled nanostructure synthesis process disclosed herein further comprises one or more purification steps. Examples of purification steps include but are not limited to, removing solvents by evaporation, removing solvents by drying, filtering, trituration, extraction, sedimentation, size exclusion chromatography, preparative column chromatography, and the like.

The size and/or morphology of the nanostructures disclosed herein can be controlled by varying the water/TEG proportions, as well as, adjusting the pH of the solutions, adding specific polymers, adjusting the ratio of the metals, and the like. Thus, the properties and characteristics of the nanostructures disclosed herein can be tailored by specific reaction conditions. By adjusting such reaction conditions, the nanostructures will change in size and/or morphology.

In a certain embodiment, using the size and/or morphology controlled nanostructure synthesis process disclosed herein results in nanostructures that are uniform in size and/or morphology. In another embodiment, using the process disclosed herein results in LFP nanostructures that are uniform in size and/or morphology. In yet another embodiment, using the process disclosed herein results in nanostructures that are nanoparticles. In a further embodiment, using the process disclosed herein results in nanostructures that are nanoprisms. In yet a further embodiment, using the process disclosed herein results in nanostructures that are nanobelts. In a certain embodiment, using the process disclosed herein results in nanostructures that are nanocubes.

In a particular embodiment, using the size and/or morphology controlled nanostructure synthesis process disclosed herein results in nanoparticles having a near uniform size distribution. In a certain embodiment, using the process disclosed herein results in nanostructures that are less than 100 μM in diameter. In yet another embodiment, using the process disclosed herein results in nanostructures that are less than 10 μM in diameter. In another embodiment, using the process disclosed herein results in nanostructures that are less than 1 μM in diameter. In a certain embodiment, using the process disclosed herein results in nanostructures that are less than 400 nM in diameter. In a further embodiment, using the process disclosed herein results in LFP nanostructures that are less than 100 nM in diameter. In yet a further embodiment, using the process disclosed herein results in LFP nanostructures that are less than 50 nM in diameter.

In a particular embodiment, a nanostructure disclosed herein is LFP nanoprisms of 1 μm×100 nm. In another embodiment, a nanostructure disclosed herein is LFP nanoparticles of 25 nm. In yet another embodiment, a nanostructure disclosed herein is 100 nm LFP nanocubes. In a certain embodiment, a nanostructure disclosed herein is 10 μm×400 nm×20 nm LFP nanobelts.

In another embodiment, one or more devices comprise one or more nanostructures synthesized using the size and/or morphology controlled nanostructure synthesis process disclosed herein. In a further embodiment, one or more devices comprising one or more nanostructures synthesized using the process disclosed herein can be used for energy storage. In yet a further embodiment, one or more devices comprising one or more nanostructures synthesized using the process disclosed herein can be used for Li-insertion batteries. In another embodiment, cathodes for an energy storing device comprise nanostructures synthesized using the process disclosed herein.

The following Examples present methods and reactions to synthesize the nanostructures of the disclosure. These Examples are presented as generalized guides to make the nanostructures of the disclosure, and should not be interpreted as the definitive process to make the nanostructures of the disclosure. Moreover, variations in the Examples presented below, include, but are not limited to, the choice of solvent, choice of metal salts, concentrations of the metal salts, changes in the heating step, changes or removal of the pH adjusting agents, changes or removal of the types and classes of polymers, adding additional purification steps, are not only presented as alternatives in the disclosure but are contemplated as being subsumed in the following Examples.

EXAMPLES

All of the solutions listed herein were mixed under vigorous stirring (~500 rpm) and at ambient temperature.

Process to Synthesis Lithium-Iron Phosphate Nanostructures:

Solution 1: A water soluble iron precursor (iron sulfate ($FeSO_4.7H_2O$, concentration from 0.001M-1M) solution was dissolved in a mixture of degassed water and triethylene glycol (TEG), wherein this water/TEG mixture can range from almost 100% water to almost 100% TEG with specific volumetric ratios in between depending on desired product.

Solution 2: An aqueous solution (concentration was 3 times that of the Fe concentration) of $LiOH.H_2O$ was prepared and mixed with TEG.

Solution 3: An equimolar (to iron) solution of $H_3PO_4$ was then added to Solution 1.

Solution 4: Solution 3 was combined with Solution 2 and the pH was adjusted to a desired level by adding an aqueous solution of $H_2SO_4$.

Solution 5: An aqueous solution of a polymer (a variety of polymers can be selected with a specific pendant group to control size and morphological features) was mixed with solution 4.

Solution 6: The pH of solution 5 was adjusted to the desired level by adding an aqueous solution of $H_2SO_4$.

Solution 6 was added to a Teflon lined stainless steel autoclave (e.g., see FIG. 1). The reactor was then sealed and heated to a temperature between 150° C.-200° C. for 2 hours-12 hours to enable hydrolysis and condensation (necessary reaction steps to synthesize lithium-iron phosphate nanostructures from the precursors). The reaction temperature does not have to be 150° C. although a minimum of 50° C. should be used to enable the hydrolysis and condensation of the iron-based precursor. After the reaction, the product was collected and washed with water to remove any unreacted precursors and polymers. The resulting product was then air dried at 40° C. for about 16 hours. The resulting lithium-iron phosphate nanostructures were then used in the construction of battery cells.

These reactions, however, are not limited to lithium-iron phosphate nanostructures and can be used to modify metal nanostructures (Au, Pd, Pt, Ru, Ni, etc.), metal oxide nanostructures (ZnO, $Co_3O_4$, $ZrO_2$, $RuO_2$, $SnO_2$, $Al_2O_3$), metal nitride ($Si_3N_4$, BN, GaN), or any combination of inorganic nanostructures.

The examples set forth above are provided to give those of ordinary skill in the art a complete disclosure and description of how to make and use the embodiments of the apparatus, systems and methods of the disclosure, and are not intended to limit the scope of what the inventors regard as their disclosure. Modifications of the above-described modes for carrying out the disclosure that are obvious to persons of skill in the art are intended to be within the scope of the following claims.

A number of embodiments of the disclosure have been described. Nevertheless, it will be understood that various modifications may be made without departing from the spirit and scope of the disclosure. Accordingly, other embodiments are within the scope of the following claims.

What is claimed is:

1. A method of synthesizing size and/or morphologically controlled nanostructures comprising mixing a first metal salt solution comprising a first metal salt and polyvinyl pyrrolidone in degassed water and triethylene glycol (TEG) with a second metal salt solution comprising a second metal salt and polyvinyl pyrrolidone in aqueous TEG and heating a reaction mixture comprising the first metal salt solution and comprising the second metal salt solution at room temperature or greater for at least 2 hours.

2. The method of claim 1, further comprising, adjusting the pH of the solution comprising the first metal salt by adding either an acid or base, adjusting the pH of the solution comprising the second metal salt by adding either an acid or base and/or adjusting the pH of the reaction mixture by adding either an acid or base.

3. The method of claim 1, wherein the first metal salt comprises a transition metal.

4. The method of claim 3, wherein the transition metal is selected from the group consisting of manganese, iron, titanium, zinc, copper, cobalt and nickel.

5. The method of claim 4, wherein the transition metal is iron.

6. The method of claim 1, wherein the first metal salt comprises a first polyatomic anion.

7. The method of claim 6, wherein the first polyatomic anion is selected from the group consisting of phosphate, sulfate, nitrate, molybdate, oxalates, chlorate, and carbonate.

8. The method of claim 7, wherein the first polyatomic anion is sulfate.

9. The method of claim 1, wherein the first metal salt is dissolved in one or more polar solvents.

10. The method of claim 1, wherein the second metal salt comprises lithium.

11. The method of claim 1, wherein the second metal salt comprises a second polyatomic anion.

12. The method of claim 11, wherein the second polyatomic anion is selected from the group consisting of hydroxide, perchlorate, carbonate, diethyl carbonate, tetrafluoroborate, hexaflourophosphate, and triflate.

13. The method of claim 12, wherein the second polyatomic anion is hydroxide.

14. The method of claim 1, wherein the second metal salt is dissolved in one or more polar solvents.

15. The method of claim 1, wherein the concentration of the first metal salt is equal to the concentration of the second metal salt.

16. The method of claim 1, wherein the concentration of the first metal salt is greater than the concentration of the second metal salt.

17. The method of claim 1, wherein the concentration of the first metal salt is less than the concentration of the second metal salt.

18. The method of claim 17, wherein the concentration of the first metal salt is at least three times less than the concentration of the second metal salt.

19. The method of claim 2, wherein the pH of the solution comprising the first metal salt, the pH of the solution of comprising the second metal salt, and/or the pH of the reaction mixture, is adjusted with either nonaqueous or aqueous acid.

20. The method of claim 19, wherein the pH of the solution comprising the first metal salt is adjusted with nonaqueous polyprotic acid.

21. The method of claim 20, wherein the nonaqueous polyprotic acid is phosphoric acid.

22. The method of claim 19, wherein the pH of the reaction mixture is adjusted with aqueous polyprotic acid.

23. The method of claim 22, wherein the aqueous polyprotic acid is aqueous sulfuric acid.

24. The method of claim 1, wherein the reaction mixture is heated at room temperature or greater for at least 2 hours in a sealed reactor.

25. The method of claim 24, wherein the reaction mixture is heated at 50° C. or greater for at least 2 hours in a sealed reactor.

26. The method of claim 25, wherein the reaction mixture is heated at 100° C. or greater in a sealed reactor.

27. The method of claim 26, wherein the reaction mixture is heated at 150° C. or greater for at least 2 hours in a sealed reactor.

28. The method of claim 27, wherein the reaction mixture is heated at a temperature between 150° C. to 200° C. for 2 to 12 hours in a sealed reactor.

29. The method of claim 1, wherein the method produces nanostructures that have a uniform size distribution.

30. The method of claim 29, wherein the nanostructures have diameters of less than 100 nm.

31. The method of claim 1, wherein the method produces nanostructures that have a uniform morphology.

32. The method of claim 31, where the morphology is selected from the group consisting of nanoparticles, nanobelts, nanocubes, and nanoprisms.

\* \* \* \* \*